United States Patent
Wolfe

(10) Patent No.: US 9,874,351 B2
(45) Date of Patent: Jan. 23, 2018

(54) THERMALLY-COUPLED FUEL MANIFOLD

(71) Applicant: General Electric Company, Schenectady, NY (US)

(72) Inventor: Jared Matthew Wolfe, West Chester, OH (US)

(73) Assignee: General Electric Company, Schenectady, NY (US)

( * ) Notice: Subject to any disclaimer, the term of this patent is extended or adjusted under 35 U.S.C. 154(b) by 118 days.

(21) Appl. No.: 14/685,631

(22) Filed: Apr. 14, 2015

(65) Prior Publication Data

US 2016/0305667 A1    Oct. 20, 2016

(51) Int. Cl.
| | |
|---|---|
| *F02C 7/22* | (2006.01) |
| *F02C 7/228* | (2006.01) |
| *F02C 9/34* | (2006.01) |
| *F23R 3/34* | (2006.01) |
| *F02C 7/224* | (2006.01) |
| *B23P 15/00* | (2006.01) |
| *F16L 9/19* | (2006.01) |
| *F16L 39/00* | (2006.01) |

(52) U.S. Cl.
CPC .............. *F23R 3/343* (2013.01); *B23P 15/00* (2013.01); *F02C 7/222* (2013.01); *F02C 7/224* (2013.01); *F02C 7/228* (2013.01); *F02C 9/34* (2013.01); *F05D 2230/31* (2013.01); *F05D 2230/53* (2013.01); *F05D 2230/642* (2013.01); *F05D 2260/20* (2013.01); *F05D 2270/31* (2013.01); *F05D 2300/50212* (2013.01); *F16L 9/19* (2013.01); *F16L 39/00* (2013.01); *Y02T 50/671* (2013.01); *Y02T 50/675* (2013.01)

(58) Field of Classification Search
CPC .............. F02C 7/22; F02C 7/222; F02C 7/228
See application file for complete search history.

(56) References Cited

U.S. PATENT DOCUMENTS

| | | | |
|---|---|---|---|
| 4,467,610 A | | 8/1984 | Pearson et al. |
| 4,735,044 A | * | 4/1988 | Richey ...................... F02C 7/22 239/424 |
| 5,218,824 A | * | 6/1993 | Cederwall ............... F23D 17/00 239/403 |
| 5,263,314 A | | 11/1993 | Anderson |

(Continued)

FOREIGN PATENT DOCUMENTS

| | | |
|---|---|---|
| CN | 1069561 A | 3/1993 |
| CN | 1782344 A | 6/2006 |

(Continued)

OTHER PUBLICATIONS

PCT Search Report and Written Opinion issued in connection with Related PCT Application No. PCT/US2013/045766 dated Sep. 27, 2013.

(Continued)

*Primary Examiner* — Pascal M Bui Pho
*Assistant Examiner* — Rene Ford
(74) *Attorney, Agent, or Firm* — General Electric Company; Brian P. Overbeck

(57) ABSTRACT

A fuel manifold apparatus includes an annular array of fuel nozzles interconnected by a plurality of manifold tubes, wherein each manifold tube includes at least two fuel passages integrally formed therein, the fuel passages being configured for conduction heat transfer therebetween.

15 Claims, 4 Drawing Sheets

(56) References Cited

U.S. PATENT DOCUMENTS

| | | | | |
|---|---|---|---|---|
| 5,427,419 | A | 6/1995 | Frey et al. | |
| 6,672,066 | B2* | 1/2004 | Wrubel | G11C 7/222 |
| | | | | 60/39.281 |
| 6,955,040 | B1* | 10/2005 | Myers, Jr. | F02C 7/236 |
| | | | | 60/39.281 |
| 7,716,933 | B2 | 5/2010 | Prociw et al. | |
| 8,079,220 | B2* | 12/2011 | Haggerty | F02C 7/222 |
| | | | | 60/739 |
| 2004/0040306 | A1 | 3/2004 | Prociw et al. | |
| 2004/0148938 | A1* | 8/2004 | Mancini | F23R 3/343 |
| | | | | 60/740 |
| 2005/0188699 | A1 | 9/2005 | Shafique et al. | |
| 2006/0107666 | A1 | 5/2006 | Kothnur et al. | |
| 2007/0044477 | A1* | 3/2007 | Held | F23D 11/24 |
| | | | | 60/776 |
| 2007/0204621 | A1 | 9/2007 | Fish | |
| 2008/0016870 | A1 | 1/2008 | Morenko | |
| 2008/0083223 | A1* | 4/2008 | Prociw | F02C 7/222 |
| | | | | 60/739 |
| 2009/0120522 | A1* | 5/2009 | Ziaei | F02C 7/222 |
| | | | | 138/115 |
| 2010/0050645 | A1 | 3/2010 | Haggerty | |
| 2010/0077758 | A1 | 4/2010 | Rudrapatna et al. | |
| 2011/0000219 | A1* | 1/2011 | Myers, Jr. | F02C 9/28 |
| | | | | 60/776 |
| 2012/0145247 | A1 | 6/2012 | Pelletier et al. | |
| 2012/0145273 | A1 | 6/2012 | Pelletier et al. | |
| 2015/0211418 | A1* | 7/2015 | Pidcock | F02C 7/222 |
| | | | | 60/739 |

FOREIGN PATENT DOCUMENTS

| | | |
|---|---|---|
| EP | 0527629 A1 | 2/1993 |
| EP | 1830036 A2 | 9/2007 |
| EP | 2902605 A1 | 8/2015 |
| JP | 04-314933 A | 11/1992 |
| JP | 2011-526974 A | 10/2011 |
| JP | 2011-526975 A | 10/2011 |
| WO | 2009148680 A2 | 12/2009 |
| WO | 2010024989 A2 | 3/2010 |
| WO | 2013188723 | 12/2013 |

OTHER PUBLICATIONS

Chinese Office Action issued in Connection with Related CN Application No. 201380031620.5 dated Jun. 30, 2015.
GE Related Case Form.
European Search Report and Written Opinion issued in connection with corresponding EP Application No. 16165043.7 dated Sep. 13, 2016.
Notification of Reasons for Refusal issued in connection with related JP Application No. 2015-517444 dated Apr. 4, 2017.
Notification of Reasons for Refusal issued in connection with corresponding JP Application No. 2016-078550 dated Apr. 11, 2017.
U.S. Appl. No. 14/407,400, filed Dec. 11, 2014, Wolfe et al.
Non-Final Office action issued in connection with Related U.S. Appl. No. 14/407,400 dated Dec. 28, 2016.

* cited by examiner

THERMALLY-COUPLED FUEL MANIFOLD

BACKGROUND OF THE INVENTION

This invention relates generally to fluid manifolds, and more particularly to fuel manifolds in gas turbine engines.

A gas turbine engine includes a turbomachinery core having a high pressure compressor, a combustor, and a high pressure turbine in serial flow relationship. The core is operable in a known manner to generate a primary gas flow. Depending on the engine's configuration, the core may be combined with a fan and low pressure turbine system to generate propulsive thrust, or with a work turbine to extract mechanical energy and turn a driveshaft or propeller.

In conventional gas turbine engines, fuel is introduced to the combustor through an array of fuel nozzles which are coupled to an annular external manifold surrounding the combustor and mounted to a combustor case. In operation, pressurized fuel is fed to the manifold. The manifold then distributes the pressurized fuel to the individual fuel nozzles through individual feed lines. Such manifolds are commonly manufactured from various tubes and fittings, and are secured to the combustor with brackets and other mounting hardware.

Aircraft engine fuel manifolds are in a harsh environment and are located relatively close to the combustor case. The combustor case grows as the engine warms, but the temperature of the fuel in the manifold stays relatively cool. This temperature difference, coupled with the different material growth rates of various components, creates a thermal loading on the manifold. In a conventional manifold the length of piping between mounting points (i.e. the nozzle-to-nozzle distance) is fixed, limiting the length of piping available to provide flexibility.

It is also known to provided "staged" fuel delivery systems which include two or more fuel circuits used during different engine operating conditions (e.g., pilot and main circuits). In a conventional fuel manifold, each circuit or stage requires separate piping and connections, increasing weight, complexity, and parts count. Furthermore, the fuel passages within the manifold and other piping are subject to undesirable carbon buildup ("coking") of the residual fuel during periods of time when fuel is not flowing in a particular circuit.

Accordingly, there remains a need for a fuel manifold which accommodates thermal growth and provides for staged fuel flow which avoiding coking.

BRIEF SUMMARY OF THE INVENTION

This need is addressed by the present invention, which provides a fluid manifold apparatus having two or more circuits which are thermally coupled.

According to one aspect of the invention, a fuel manifold apparatus includes: an annular array of fuel nozzles interconnected by a plurality of manifold tubes, wherein each manifold tube includes at least two fuel passages integrally formed therein, the fuel passages being configured for conduction heat transfer therebetween.

According to another aspect of the invention, each manifold tube is a monolithic component formed using an additive manufacturing process.

According to another aspect of the invention, each manifold tube includes: a pilot primary fuel passage; a pilot secondary fuel passage; and a main fuel passage.

According to another aspect of the invention each fuel nozzle includes: a pilot primary fuel circuit and a pilot primary fuel nozzle connected in fluid communication with the pilot primary fuel passage; a pilot secondary fuel circuit and a pilot secondary fuel nozzle connected in fluid communication with the pilot secondary fuel passage; and a main fuel circuit and a main fuel ring connected in fluid communication with the main fuel passage.

According to another aspect of the invention, the apparatus further includes: a fuel system operable to supply a flow of liquid fuel at varying flowrates; a pilot primary fuel conduit coupled between the fuel system and the pilot primary fuel passages; a pilot secondary fuel conduit coupled between the fuel system and the pilot secondary fuel passages; and a main fuel conduit coupled between the fuel system and the main fuel passages.

According to another aspect of the invention the main fuel passage is centrally located within a cross-sectional shape of the manifold tube; the pilot primary fuel passage is arcuate and disposed concentrically with the main fuel passage; and the pilot secondary fuel passage is arcuate and disposed concentrically with the main fuel passage.

According to another aspect of the invention each manifold tube includes a tube segment with an end flange disposed at first and second ends thereof.

According to another aspect of the invention, each fuel nozzle is coupled to a valve housing which includes a coupling flange; and each coupling flange is connected to the end flanges of two adjacent ones of the manifold tubes.

According to another aspect of the invention each valve housing includes: the coupling flange; a mounting flange disposed perpendicular to the coupling flange; and at least one lobe disposed between the coupling flange and the mounting flange.

According to another aspect of the invention, the at least one lobe includes a splitter valve disposed therein.

According to another aspect of the invention, the valve housing is a monolithic component formed using an additive manufacturing process.

According to another aspect of the invention each manifold tube connects alternate ones of the fuel nozzles.

According to another aspect of the invention, the manifold is configured as first and second rings of manifold tubes; the first ring interconnects a first group of the fuel nozzles; the second ring interconnects a second group of the fuel nozzles; and wherein the fuel nozzles of the first group alternate with the fuel nozzles of the second group.

According to another aspect of the invention, the manifold tubes of the first ring are interlaced with the manifold tubes of the second ring.

According to another aspect of the invention, a rotary machine includes: a compressor, a combustor, and a turbine arranged in serial flow communication and operable to generate a core flow; and a fuel manifold, including: an annular array of fuel nozzles communicating with the combustor, the fuel nozzles interconnected by a plurality of manifold tubes, wherein each manifold tube includes at least two fuel passages integrally formed therein, the fuel passages being configured for conduction heat transfer therebetween.

According to another aspect of the invention, the rotary machine further includes a second turbine arranged to extract energy from the core flow and to drive a fan.

According to another aspect of the invention, a method of assembling a fuel manifold includes: positioning an annular array of fuel nozzles in communication with a combustor; and interconnecting the fuel nozzles using a plurality of manifold tubes, wherein each manifold tube includes at least two fuel passages integrally formed therein, the fuel passages being configured for conduction heat transfer therebetween.

According to another aspect of the invention, each manifold tube includes a pilot primary fuel passage, a pilot secondary fuel passage, and a main fuel passage; and each fuel nozzle includes: a pilot primary fuel circuit communicating with a pilot primary fuel nozzle, a pilot secondary fuel circuit communicating with a pilot secondary fuel nozzle, and a main fuel circuit communicating with a main fuel ring; the method further including connecting the fuel circuits of the fuel nozzles in fluid communication with the respective fuel passages of the manifold tubes.

According to another aspect of the invention, each fuel nozzle is coupled to a valve housing which includes a coupling flange, the method further comprising connecting each coupling flange to end flanges of two adjacent ones of the manifold tubes.

According to another aspect of the invention, each manifold tube is a monolithic component formed using an additive manufacturing process.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
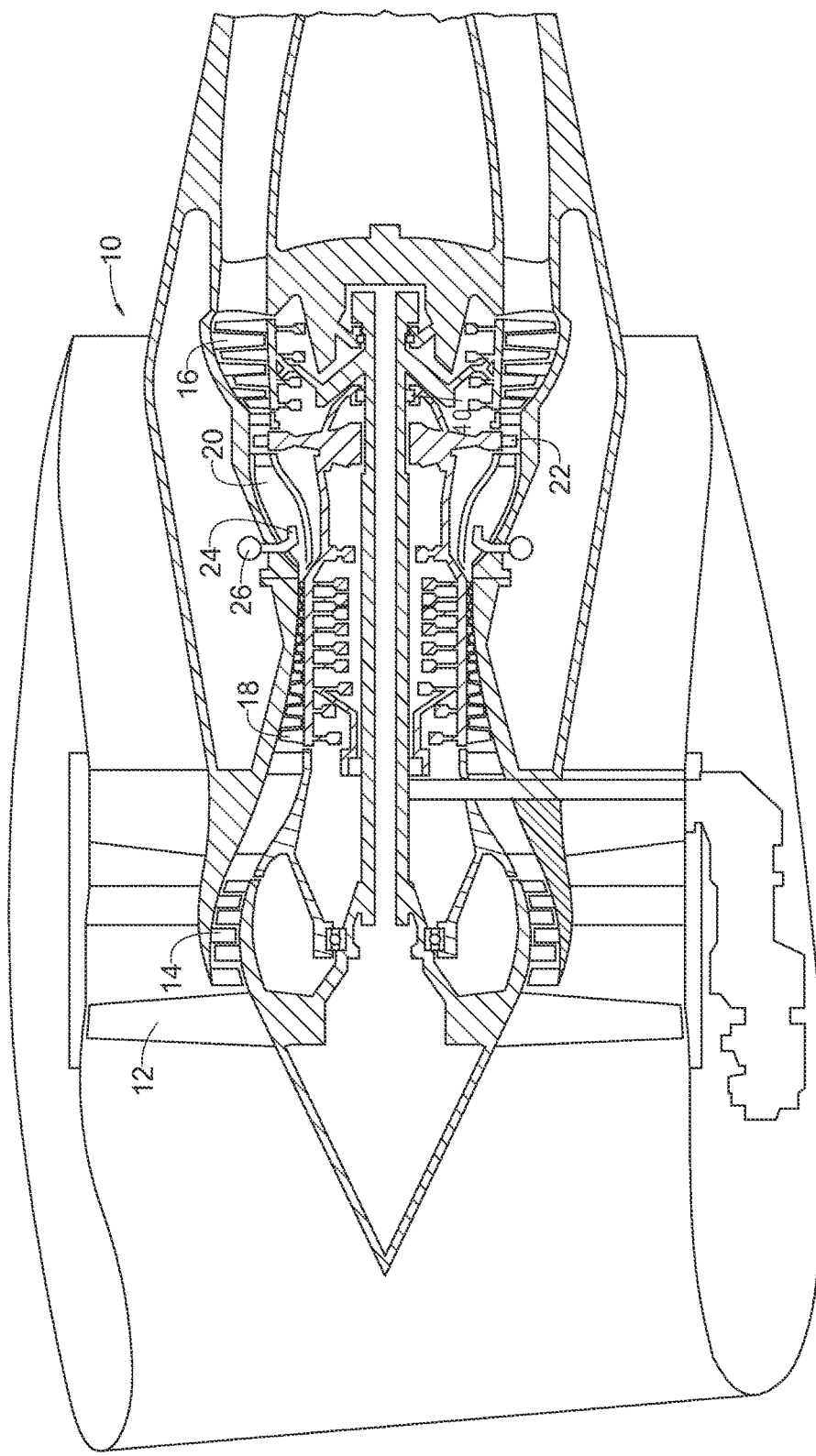
FIG. 1 is a schematic half-sectional view of a gas turbine engine incorporating a fluid manifold constructed in accordance with an aspect of the present invention.

Referring to the drawings wherein identical reference numerals denote the same elements throughout the various views, FIG. 1 depicts an exemplary gas turbine engine 10 having in serial flow communication a fan 12, an optional low pressure compressor or "booster" 14 and a low pressure turbine ("LPT") 16 collectively referred to as a "low pressure system", and a high pressure compressor ("HPC") 18, a combustor 20, and a high pressure turbine ("HPT") 22, arranged in serial flow communication and collectively referred to as a "gas generator", "core", or "high pressure system". The HPT 22 drives the HPC 18 through a mechanical connection such as a shaft, and the LPT 16 drives the fan 12 and booster 14 (if present) through a mechanical connection such as a shaft. The high pressure system is operable in a known manner to generate a primary or core flow. The low pressure system is operable in a known manner to extract energy from the core flow and generate a fan flow or bypass flow. While the illustrated engine 10 is a high-bypass turbofan engine, the principles described herein are equally applicable to turboprop, turbojet, and turboshaft engines, as well as turbine engines used for other vehicles or in stationary applications.

Figure 2:
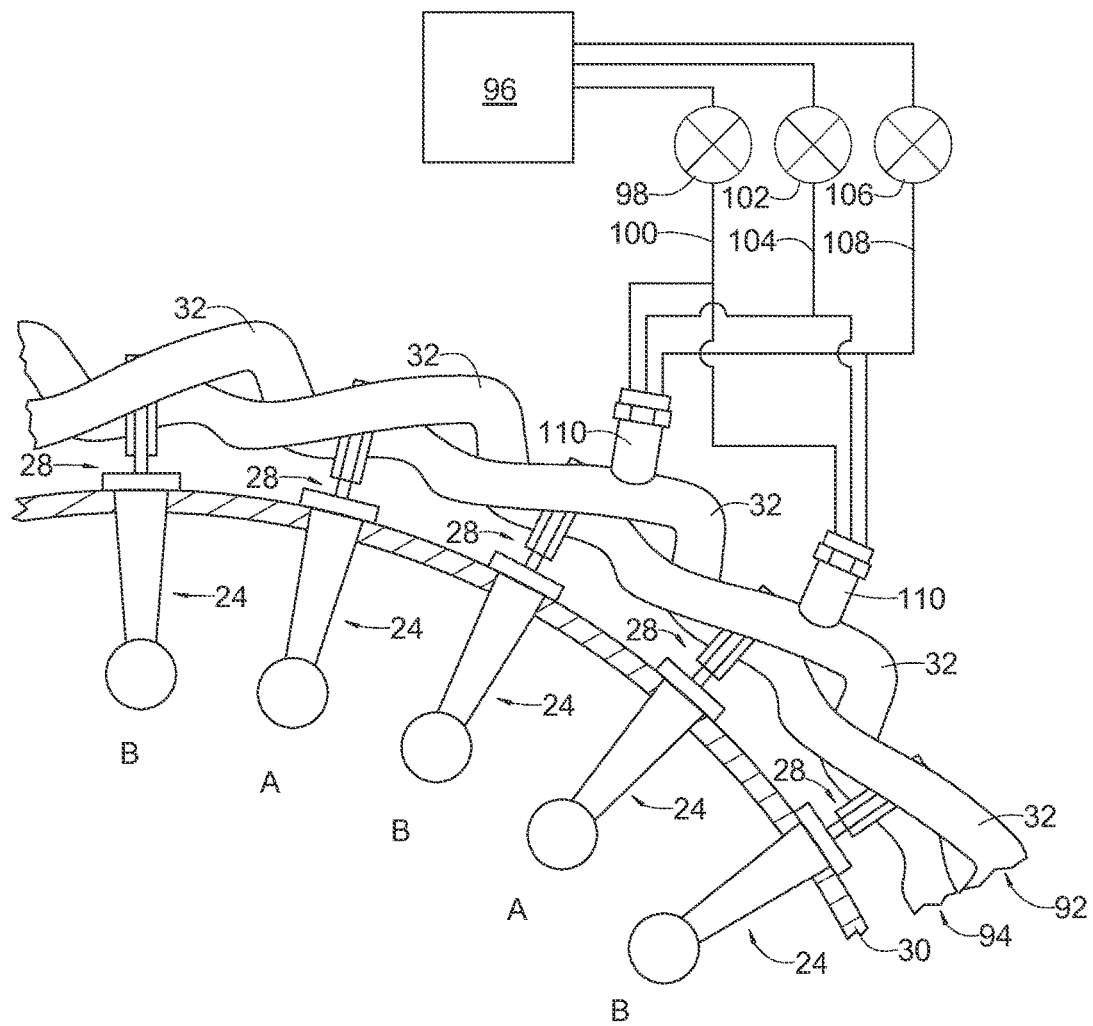
FIG. 2 is a schematic, rear elevational view of a portion of a manifold.

The combustor 20 includes a radial array of fuel nozzles 24 which are coupled to a fuel manifold 26 surrounding the combustor 20. Generally, as seen in FIG. 2, the fuel manifold 26 includes a plurality of valve housings 28, each of which is coupled to one of the fuel nozzles 24 and which may be integral with the corresponding fuel nozzle 24. The valve housings 28 are mounted to the combustor casing 30, in an annular array. The valve housings 28 (and thus the fuel nozzles 24) are interconnected by a plurality of manifold tubes 32.

In the illustrated example, (see FIGS. 3 and 5), each valve housing 28 includes a mounting flange 34 with a pattern of bolt holes 36 formed therein for securing the mounting flange 34 to the combustor casing 30, a coupling flange 38 oriented perpendicular to the mounting flange 34, and one or more lobes 40 joining the mounting flange 34 and the coupling flange 38.

Each fuel nozzle 24 (see FIG. 3) includes a stem 42 extending radially inward from the mounting flange 34 and terminating at a nozzle tip 44 at its inboard end. The nozzle tip 44 includes a pilot fuel injector 48 with a pilot primary nozzle 50 and a pilot secondary nozzle 52. The nozzle tip 44 also includes an annular main fuel ring 54 with an array of main fuel orifices 56 around its periphery.

Figure 3:
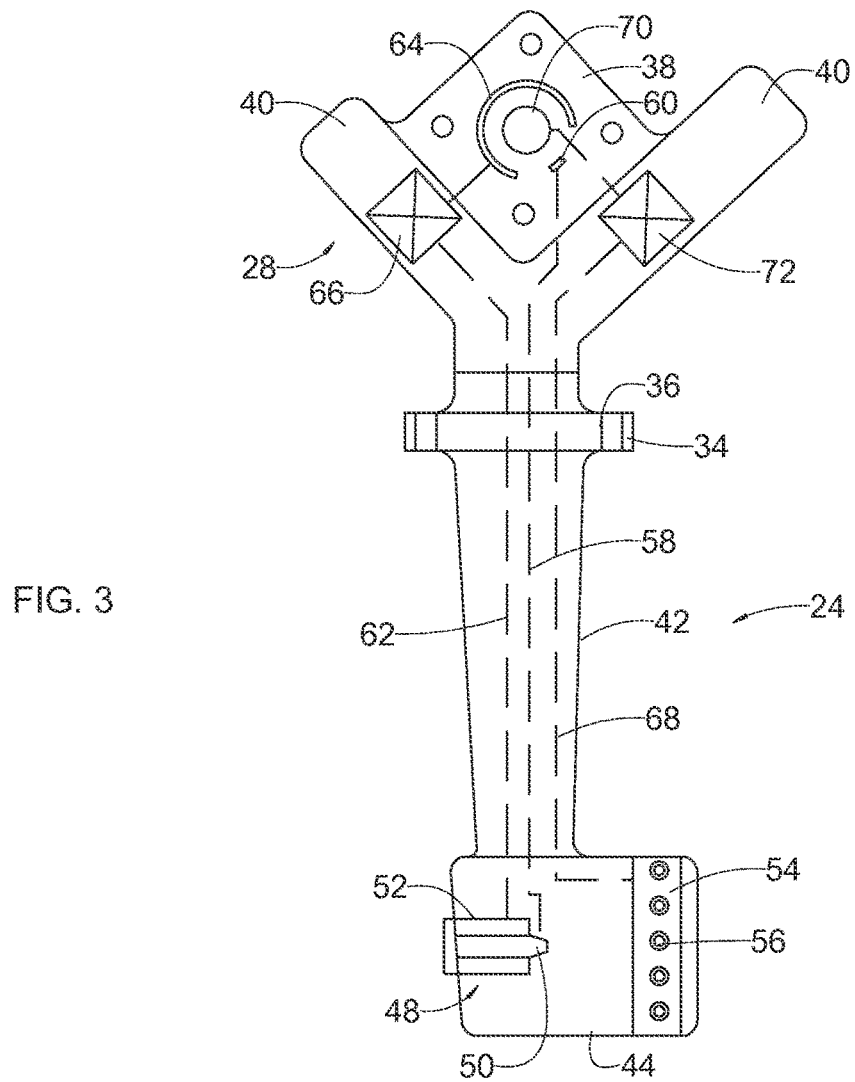
FIG. 3 is a side view of a fuel nozzle and valve housing.

The valve housing 28 and fuel nozzle 24 may incorporate two or more fuel circuits therein. In FIG. 3 each circuit is represented schematically by a single dashed line, with the understanding that each line may represent one or more discreet pipes or tubes, or one or more internal fuel passages formed integrally with the valve housing 28 and/or the fuel nozzle 24.

A pilot primary fuel circuit 58 extends from a pilot primary fuel port 60 formed in the coupling flange 38, through the stem 42, to the pilot primary nozzle 50.

A pilot secondary fuel circuit 62 extends from a pilot secondary fuel port 64 formed in the coupling flange 38, to a pilot secondary splitter valve 66 disposed in one of the lobes 40, through the stem 42, to the pilot secondary nozzle 52. The pilot secondary splitter valve 66 is operable to permit flow to the fuel nozzle 24 but block flow the opposite direction, and may be, for example, a pressure-operated valve.

A main fuel circuit 68 extends from a main fuel port 70 formed in the coupling flange 38, to a main splitter valve 72 disposed in one of the lobes 40, through the stem 42, to the main fuel ring 54. The main splitter valve 72 is operable to permit flow to the fuel nozzle 24 but block flow the opposite direction, and may be, for example, a pressure-operated valve.

Figure 4:
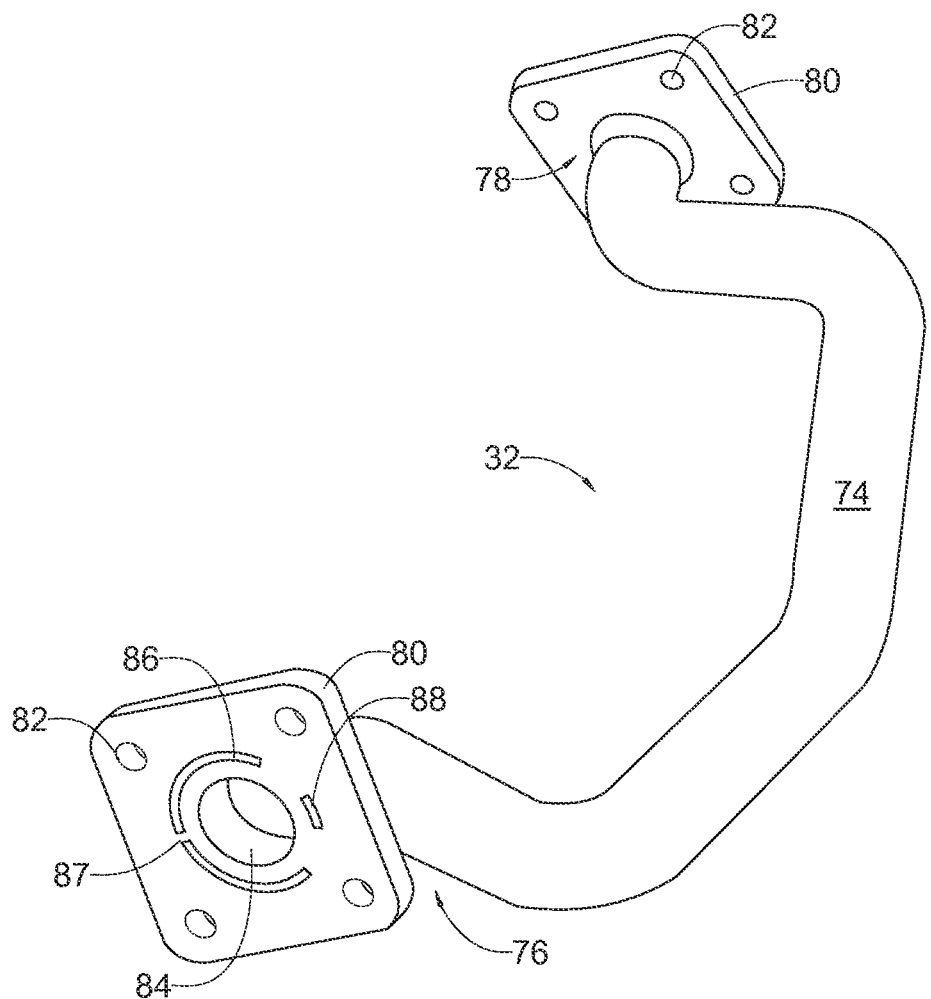
FIG. 4 is a perspective view of one manifold tube of a manifold constructed according to an aspect of the present invention.

FIG. 4 depicts one of the manifold tubes 32. The manifold tube 32 includes a tube segment 74 having first and second ends 76, 78, with an end flange 80 disposed at each end. Each end flange 80 includes a pattern of bolt holes 82 formed therein matching the bolt holes in the coupling flange 38. The tube segment 74 may have one or more bends formed therein to suit a specific application.

The manifold tube 32 contains multiple interior passages. Each passage runs from the first end 76 to the second end 78. In the illustrated example, the manifold tube 32 includes a centrally-located main fuel passage 84 with a circular cross-section shape. An arcuate pilot secondary fuel passage 86 is disposed concentrically with the main fuel passage 84. An arcuate pilot primary fuel passage 88 is also disposed concentrically with the main fuel passage 84. The cross-sectional area of the pilot fuel passages 86, 88 are sized in proportion to the relative fuel flow rates therethrough. In the illustrated example, the pilot secondary fuel passage 86 extends over approximately ¾ of a circle, while the pilot primary fuel passage 88 extends over less than approximately ¼ of a circle. In the illustrated example, the cross-sectional shape of the pilot secondary fuel passage 86 incorporates a small radially-extending strut 87 which provides mechanical support. This could take the form of a single continuous rib, or an array of short pins or ribs along the length of the manifold tube 32. The cross-sectional pattern may extend prismatically through the manifold tube 32, or it may extend along a spiral or helical path.

In this configuration the pilot fuel passages 86, 88 are thermally coupled with the main fuel passage 84. More specifically, the pilot fuel passages 86, 88 are separated from the main fuel passage 84 by a single wall thickness which readily permits conduction heat transfer from the main fuel passage 84 to the pilot fuel passages 86, 88. This will be effective to reduce or prevent coking of fuel in the main fuel passage 84 during conditions when fuel is not flowing therein.

As seen in FIG. 2, the valve housings 28 are arranged in annular form around the combustor casing 30 (only a portion of the full circle is shown in FIG. 2). The valve housings 28 are interconnected by a plurality of the manifold tubes 32.

Figure 5:
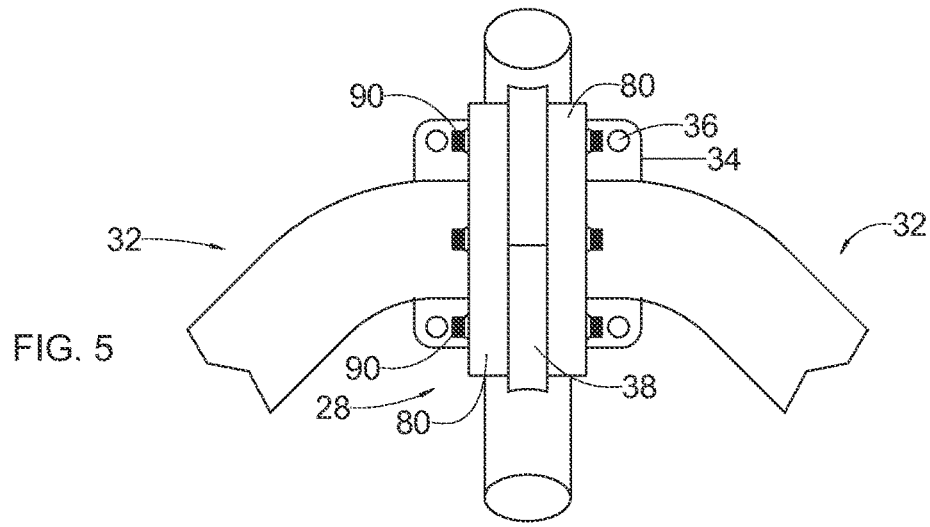
FIG. 5 is a plan view showing a valve housing of the manifold.

As shown in FIG. 5, each coupling flange 38 is clamped between the end flanges 80 of two adjacent manifold tubes 32, for example using fasteners such as the illustrated bolts 90. Each of the fuel passages in the manifold tube 32 mates with the corresponding ports in the coupling flange 38. Thus connected, a continuous fluid flow path is defined for the passages 84, 86, and 88 in the manifold tubes 32.

In the illustrated example, (see FIG. 2) the fuel manifold 26 includes two rings 92 and 94. Within each ring 92, 94, each manifold tube 32 connects two valve housings 28 that are separated by an intervening valve housing 28. Stated another way, alternate ones of the valve housings 28 (and thus alternate ones of the fuel nozzles 24) are connected by a manifold tube 32 for each ring 92, 94. This configuration makes the length of the manifold tube 32 independent from the distance between two adjacent valve housings 28. It is also possible that each manifold tube 32 could span a greater distance, for example connecting every third or fourth valve housing 28. In FIG. 2, one-half of the valve housings 28, marked "A", belong to the first ring 92, and the other half of the valve housings 28, marked "B", belong to the second ring 94. The first and second rings 92, 94 are interlaced or intertwined with each other, the manifold tubes 32 being shaped to facilitate this configuration.

The fuel manifold 26 is connected to a fuel system 96 of a known type, operable to supply a flow of liquid fuel at varying flowrates according to operational need. The fuel system 96 supplies fuel to a pilot primary control valve 98 which is coupled to a pilot primary fuel conduit 100, which in turn supplies fuel to the pilot primary fuel passages 88 and ultimately to the pilot primary circuits 58. The fuel system 96 also supplies fuel to a pilot secondary fuel control valve 102 which is coupled to a pilot secondary conduit 104, which in turn supplies fuel to the pilot secondary fuel passages 88 and ultimately to the pilot secondary fuel circuits 62. The fuel system 96 also supplies fuel to a main fuel control valve 106, which is coupled to a main fuel conduit 108, which in turn supplies the main fuel passages 84 and ultimately the main fuel circuits 68.

Each ring 92, 94 includes one or more feed tubes 110. Each feed tube 110 may be coupled to one of the manifold tubes 32, and serves as a connection point from the fuel flow into the fuel manifold 26 from the fuel system 96.

The fuel manifold 26 and its constituent components may be made from a suitable metallic alloy, such as an iron- or nickel-based alloy, consistent with conventional practice.

All or part of the fuel manifold 26 or individual components thereof may be part of a single unitary, one-piece, or monolithic component, and may be manufactured using a manufacturing process which involves layer-by-layer construction or additive fabrication (as opposed to material removal as with conventional machining processes). Such processes may be referred to as "rapid manufacturing processes" and/or "additive manufacturing processes," with the term "additive manufacturing process" being term herein to refer generally to such processes. Additive manufacturing processes include, but are not limited to: Direct Metal Laser Sintering (DMLS), Direct Metal Laser Melting (DMLM), Laser Net Shape Manufacturing (LNSM), electron beam sintering, Selective Laser Sintering (SLA), 3D printing, such as by inkjets and laserjets, Sterolithography (SLS), Electron Beam Melting (EBM), Laser Engineered Net Shaping (LENS), and Direct Metal Deposition (DMD).

The fuel manifold 26 described herein has several advantages over a conventional design. It will provide the ability to increase the amount of fuel staging to reduce specific fuel consumption ("SFC") and emissions while at the same time thermally coupling the fuel circuits to improve coking margin and improve external packaging. Assembly and maintenance time are also reduced.

The fuel manifold 26 will lower the heat rise in the fuel manifold and be a much simpler fuel delivery system with substantial weight reduction. Fuel delivery to every other nozzle allows for developed tube length to dissipate the thermal stresses. Finally, the use of a concentric interface at each fuel nozzle simplifies maintenance and allows for the splitter valves to be nested in a smaller package.

The foregoing has described a fuel manifold for a gas turbine engine fuel nozzle. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying potential points of novelty, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A fuel manifold apparatus, comprising:
   an annular array of fuel nozzles interconnected by a plurality of manifold tubes, wherein each manifold tube includes at least two fuel passages integrally formed therein, the fuel passages being configured for conduction heat transfer therebetween;
   wherein each manifold tube includes a tube segment with an end flange disposed at first and second ends thereof;
   wherein each fuel nozzle is coupled to a valve housing which includes a coupling flange and each coupling flange is connected to the end flanges of two adjacent ones of the manifold tubes;
   wherein each valve housing includes the coupling flange, a mounting flange disposed perpendicular to the coupling flange, and at least one lobe disposed between the coupling flange and the mounting flange; wherein the at least one lobe includes a splitter valve disposed therein.

2. The apparatus of claim 1 wherein each manifold tube is a monolithic component formed using an additive manufacturing process.

3. The apparatus of claim 1 wherein the at least two fuel passageways of each manifold tube includes: a pilot primary fuel passage; a pilot secondary fuel passage; and a main fuel passage.

4. The apparatus of claim 3 wherein each fuel nozzle includes:
a pilot primary fuel circuit and a pilot primary fuel nozzle connected in fluid communication with the pilot primary fuel passage;
a pilot secondary fuel circuit and a pilot secondary fuel nozzle connected in fluid communication with the pilot secondary fuel passage; and
a main fuel circuit and a main fuel ring connected in fluid communication with the main fuel passage.

5. The apparatus of claim 3 further comprising:
a fuel system operable to supply a flow of liquid fuel at varying flowrates;
a pilot primary fuel conduit coupled between the fuel system and the pilot primary fuel passages;
a pilot secondary fuel conduit coupled between the fuel system and the pilot secondary fuel passages; and
a main fuel conduit coupled between the fuel system and the main fuel passages.

6. The apparatus of claim 3 wherein:
the main fuel passage is centrally located within a cross-sectional shape of the manifold tube;
the pilot primary fuel passage is arcuate and disposed concentrically with the main fuel passage; and
the pilot secondary fuel passage is arcuate and disposed concentrically with the main fuel passage.

7. The apparatus of claim 1 wherein each manifold tube connects alternate ones of the fuel nozzles.

8. The apparatus of claim 1 comprising:
first and second rings of manifold tubes;
wherein the first ring interconnects a first group of the fuel nozzles;
wherein the second ring interconnects a second group of the fuel nozzles; and
wherein the fuel nozzles of the first group alternate with the fuel nozzles of the second group.

9. A fuel manifold apparatus, comprising:
an annular array of fuel nozzles interconnected by a plurality of manifold tubes, wherein each manifold tube includes at least two fuel passages integrally formed therein, the fuel passages being configured for conduction heat transfer therebetween;
wherein each manifold tube includes a tube segment with an end flange disposed at first and second ends thereof;
wherein each fuel nozzle is coupled to a valve housing which includes a coupling flange, a valve is located within the valve housing; and each coupling flange is connected to the end flanges of two adjacent ones of the manifold tubes;
wherein each valve housing includes the coupling flange, a mounting flange disposed perpendicular to the coupling flange, and at least one lobe disposed between the coupling flange and the mounting flange; wherein the valve housing is a monolithic component formed using an additive manufacturing process.

10. The apparatus of claim 9 wherein the manifold tubes of the first ring are interlaced with the manifold tubes of the second ring.

11. A rotary machine, comprising:
a compressor, a combustor, and a turbine arranged in serial flow communication and operable to generate a core flow; and
a fuel manifold, comprising:
an annular array of fuel nozzles communicating with the combustor, the fuel nozzles interconnected by a plurality of manifold tubes, wherein each manifold tube includes at least two fuel passages integrally formed therein, the fuel passages being configured for conduction heat transfer therebetween;
wherein each manifold tube includes a tube segment with an end flange disposed at first and second ends thereof;
wherein each fuel nozzle is coupled to a valve housing which includes a coupling flange, a valve is located within the valve housing; and each coupling flange is connected to the end flanges of two adjacent ones of the manifold tubes;
wherein each valve housing includes the coupling flange, a mounting flange disposed perpendicular to the coupling flange, and at least one lobe disposed between the coupling flange and the mounting flange; wherein the valve housing is a monolithic component formed using an additive manufacturing process.

12. The rotary machine of claim 11 further comprising a second turbine arranged to extract energy from the core flow and to drive a fan.

13. A method of assembling a fuel manifold, comprising:
positioning an annular array of fuel nozzles in communication with a combustor; interconnecting the fuel nozzles using a plurality of manifold tubes,
wherein each manifold tube includes at least two fuel passages integrally formed therein, the fuel passages being configured for conduction heat transfer therebetween;
wherein each manifold tube includes a tube segment with an end flange disposed at first and second ends thereof;
wherein each fuel nozzle is coupled to a valve housing which includes a coupling flange and each coupling flange is connected to the end flanges of two adjacent ones of the manifold tubes;
wherein each valve housing includes the coupling flange, a mounting flange disposed perpendicular to the coupling flange, and at least one lobe disposed between the coupling flange and the mounting flange; wherein the at least one lobe includes a splitter valve disposed therein.

14. The method of claim 13 wherein:
the at least two fuel passages of each manifold tube includes a pilot primary fuel passage, a pilot secondary fuel passage, and a main fuel passage; and
each fuel nozzle includes: a pilot primary fuel circuit communicating with a pilot primary fuel nozzle, a pilot secondary fuel circuit communicating with a pilot secondary fuel nozzle, and a main fuel circuit communicating with a main fuel ring;
the method further comprising connecting the fuel circuits of the fuel nozzles in fluid communication with the respective fuel passages of the manifold tubes.

15. The method of claim 13 wherein each manifold tube is a monolithic component formed using an additive manufacturing process.

* * * * *